3,485,828
6,7-ETHYLENE AND 6,7-SUBSTITUTED ETHYLENE DERIVATIVES OF THE PREGNANE SERIES
John A. Zderic, Mexico City, Mexico, assignor to Syntex Corporation, Panama, Panama, a corporation of Panama
No Drawing. Continuation-in-part of application Ser. No. 544,849, Apr. 25, 1966. This application Apr. 10, 1967, Ser. No. 629,370
Int. Cl. C07c *173/00, 169/50;* A61k *27/00*
U.S. Cl. 260—239.55    20 Claims

ABSTRACT OF THE DISCLOSURE 6,7-ethylene and 6,7-substituted ethylene derivatives of the pregnane, including the 19-nor pregnane, series having progestational activity are prepared by the photochemical cycloaddition of an olefin of the formula:

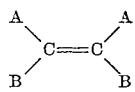

wherein A is hydrogen or fluoro, and B is hydrogen, fluoro, chloro, methyl or phenyl, to a 3-keto-$\Delta^{4,6}$-diene of the pregnane, or 19-nor pregnane, series.

---

This in a continuation-in-part of application, Ser. No. 544,849 filed Apr. 25, 1966, now abandoned.

This invention relates to novel cyclopentanophenanthrene derivatives and to a process for the production thereof. More specifically, this invention relates to novel 6,7-ethylene and 6,7-substituted ethylene derivatives of the pregnane series.

The compounds of the present invention are represented by the following formula:

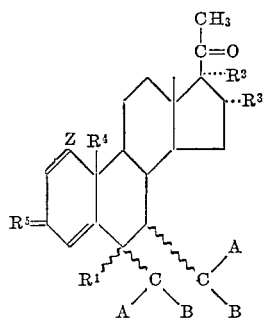

wherein Z is a carbon-carbon single bond or a carbon-carbon double bond;
$R^1$ is hydrogen, chloro, fluoro or methyl;
$R^2$ is hydrogen, hydroxy or a hydrocarbon carboxylic acyloxy group of less than 12 carbon atoms;
$R^4$ is hydrogen or methyl; $R^4$ being methyl when Z is a carbon-carbon double bond;
$R^5$ is keto or the group

in which $R^6$ is hydrogen, tetrahydropyran-2'-yl or a hydrocarbon carboxylic acyl group of less than 12 carbon atoms, $R^5$ being keto when Z is a carbon-carbon double bond;
A is hydrogen or fluoro; and
B is hydrogen, fluoro, chloro, methyl or phenyl.

The wavy line "⌇" at C–6 and C–7 indicates both alpha and beta configurations for the 6,7-ethylene and 6,7-substituted ethylene derivatives of the pregnane series, i.e. the 6α,7α-ethylene and 6α,7α-substituted ethylene derivatives of the pregnane series along with the 6β,7β-ethylene and 6β,7β-substituted ethylene derivatives of the pregnane series. The wavy line "⌇" at C–6 indicates both alpha and beta configurations for the $R^1$ substituent.

The hydrocarbon carboxylic acyloxy groups of the present invention contain less than 12 carbon atoms and are of a straight, branched, cyclic or cyclic-aliphatic chain structure. This structure is saturated, unsaturated or aromatic and optionally substituted by functional groups such as hydroxy, ethoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The novel compounds of the present invention are progestational agents and are useful in fertility control and the management of various menstrual disorders. These compounds can be administered via usual routes, i.e. orally or parenterally, in pharmaceutically acceptable compositions and at dosage rates of from 0.5γ to 5 mg./kg./day. However, dosage rates below or above this range can be used, the most favorable dosage range being conditioned upon the purpose for which it is administered and the response thereto.

The novel compounds of the present invention are prepared in accordance with the following sequence;

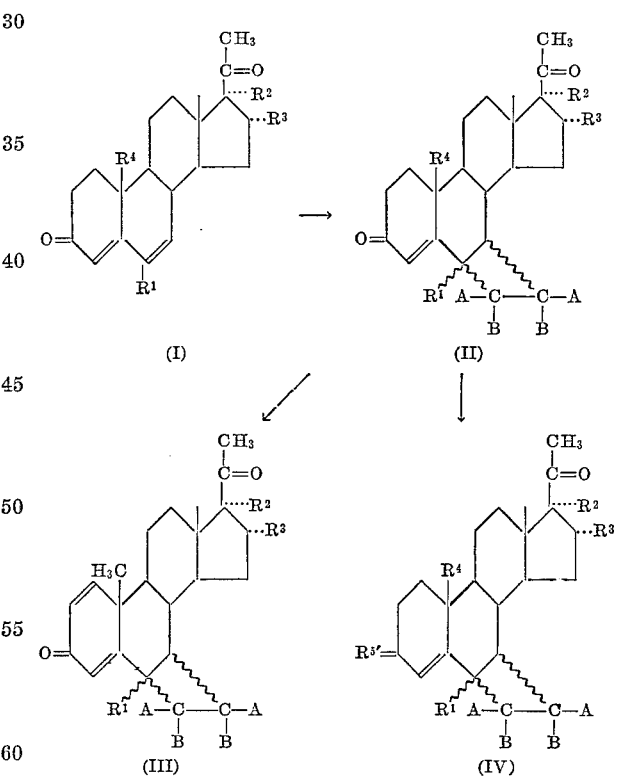

wherein $R^{5'}$ is the group

in which $R^6$ is hydrogen, tetrahydropyran-2'-yl or a hydrocarbon carboxylic acyl group of less than 12 carbon atoms; and $R^1$, $R^2$, $R^3$, $R^4$, A and B are as previously defined.

In the practice of the present invention the starting material of Formula I, i.e., an unsubstituted or appropriately substituted 3-keto-Δ⁴,⁶-diene, and an olefin of the formula:

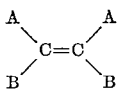

wherin each of A and B is as previously defined, are irradiated with ultraviolet light in an inert organic solvent, such as benzene, dioxane and the like or mixtures thereof, to effect the photochemical cycloaddition of the olefin and thereby afford the 6,7-ethylene or 6,7-substituted ethylene cycloaddition product as shown by Formula II. A preferred choice for the cycloaddition employs benzene as the inert organic solvent and ultraviolet light of a wavelength of about 270 to about 330 mμ. Preferably, the photochemical cycloaddition is performed at room temperature for from about 1 to about 12 hours. Any suitable source of ultraviolet irradiation of a wavelength of about 270 to about 330 mμ can be employed for the photochemical cycloaddition reaction. Among such sources are commercially available high pressure mercury lamps, such as a 70 watt Hanau lamp, a 200 watt Hanovia, and the like.

Under the above conditions, the photochemical cycloaddition of the olefin occurs at the 4,5- and 6,7-double bonds to afford a mixture of 4,5-ethyelne or 4,5-substituted ethylene and 6,7-ethylene or 6,7-substituted ethylene products. The orientation of the resulting 4,5-ethylene or substituted ethylene group with respect to the steroid nucleus is both alpha and beta, i.e., the products having the 4α,5α-, 4β,5β-, and 4β,5α-configurations. The orientation of the resulting 6,7-ethylene or 6,7-substituted ethylene group with respect to the steroid nucleus is both alpha and beta, i.e., the products having the 6α,7α- and 6β,7β-configurations, and the 6α,7α-isomer generally being the predominant product. The mixture of products is routinely separated by a conventional procedure, such as column chromatography to yield the 6α,7α-ethylene-6β,7β-ethylene-, the 6α,7α-substituted ethylene- and 6β,7β-substituted ethylene- derivatives of the present invention.

Subsequent to the photochemical cycloaddition a 3-keto-Δ⁴-ene-6,7-cyclo adduct of Formula II (wherein R⁴=CH₃) is treated with 2,3-dichloro-5,6-dicyanobenzoquinone in dioxane to afford a novel 3-keto-Δ¹,⁴-diene-6,7-cyclo adduct of Formula III. In addition, a 3-keto-Δ⁴-ene-6,7-cyclo adduct of Formula II is selectively reduced with sodium borohydride in isopropanol to afford a corresponding 3β-hydroxy - Δ⁴ - ene - 6,7 - cyclo adduct of Formula IV which is subsequently treated with dihydropyran and an acid catalyst such as p-toluenesulfonic acid either alone or in an inert organic cosolvent such as benzene or with a hydrocarbon carboxylic acid anhydride and pyridine to yield a corresponding 3β-(tetrahydropyran-2'-yloxy) or a corresponding 3β-acyloxy) - 6,7-cyclo adduct, respectively, each of which is included in Formula IV.

As an alternative to the above outlined reaction sequence, the starting material of Formula I can be selected from a compound containing a 17α-hydroxy group and elaborations can be performed by conventional techniques subsequent to the photochemical cycloaddition. Thus, for example, a 17α-hydroxy cyclo adduct of Formulas II, III or IV is treated with a hydrocarbon carboxylic acid anhydride and p-toluenesulfonic acid in an inert organic solvent such as benzene to afford a corresponding 17α-acyloxy cyclo adduct.

As a second alternative to the above outlined reaction sequence, the Δ⁴,⁶-diene-3,20-dione starting material of Formula I can be reduced to a corresponding Δ⁴,⁶-diene-3β,20-diol by treatment with a reducing agent such as sodium borohydride in an inert organic solvent such as methanol. The latter diol can then be selectively oxidized at C-3 such as by treatment with manganese dioxide, 2,3-dichloro-5,6-dicyanobenzoquinone and the like, to a corresponding Δ⁴,⁶-diene-20-hydroxy-3-one which is converted by the photochemical addition reaction as described hereinabove to a corresponding 6,7-cycloadduct-Δ⁴-ene-20-hydroxy-3-one. Subsequent to the photochemical reaction, the 20-hydroxy group in the latter 6,7-cycloadduct is oxidized to a corresponding 20-keto group such as, e.g., with chromic oxide in pyridine.

As a further alternative to preparing a 17α-hydroxy-compound of Formula II, a Δ⁴,⁶-diene-17α,21-dihydroxy-3,20-dione is converted to a corresponding 17α,20:20,21-bismethylenedioxy by conventional treatment with formaldehyde and hydrochloric acid. A thus-obtained Δ⁴,⁶-diene-3-one with the protecting group intact is converted by the photochemical addition reaction as described hereinabove to a corresponding 6,7-cycloadduct-Δ⁴-ene-3-one with the protecting group still intact. Subsequent to the photochemical cycloaddition the 17α,21-dihydroxy-20-one side chain is regenerated by conventional treatment of the 17,20:20,21-dismethylenedioxy protecting group with aqueous acetic acid. The free 21-hydroxy group in the thus-obtained 6,7-cycloadduct-Δ⁴-ene-17α,21 - dihydroxy-3,20 dione is treated by conventional techniques first with tosyl chloride, methanesulfonyl chloride or the like, second with sodium iodide in acetic acid and third with sodium metabisulfite in 80% aqueous ethanol to afford a 21-unsubstituted-17α-hydroxy-6,7-cycloadduct of the present invention.

The Δ⁴,⁶-diene starting materials of Formula I are conveniently prepared by treating the corresponding 3-keto-Δ⁴-ene compound with chloranil in a solvent, such as t-butanol, xylene or the like, under reflux for a period of 1 to 12 hours.

The following examples are set forth to illustrate but are not intended to limit the scope of the present invention.

EXAMPLE 1

A mixture of 2.0 g. of pregna-4,6-diene-3,20-dione in 140 ml. of benzene in a Pyrex container is irradiated with a 200 watt high pressure mercury vapor lamp at room temperature for a period of several hours while bubbling ethylene through the solution. At the end of the reaction time, which is followed by U.V. spectra, the reaction mixture is evaporated in vacuo to dryness to furnish a residue containing a 4α,5α-ethylene adduct, a 4β,5β-ethylene adduct, a 4β,5α-ethylene adduct, a 6α,7α-ethylene adduct, and a 6β,7β-ethylene adduct. The residue is separated by chromatography on silica eluting with ethyl acetate:benzene to yield 6α,7α-ethylenepregn-4-ene-3,20-dione and 6β,7β-ethylenepregn-4-ene-3,20-dione, each of which is recrystallized from methanol:methylene chloride.

Utilizing the same procedure, the following starting materials, namely 6-chloropregna-4,6-diene-3,20-dione;
6-chloro-19-norpregna-4,6-diene-3,20-dione;
6-fluoro-16α-methylpregna-4,6-diene-3,20-dione;
6,16α-dimethyl-19-norpregna-4,6-diene-3,20-dione;
19-norpregna-4,6-diene-3,20-dione;
17α-hydroxy-19-norpregna-4,6-diene-3,20-dione;
16α-methylpregna-4,6-diene-3,20-dione;
16α-methyl-19-norpregna-4,6-diene-3,20-dione;
17α-acetoxypregna-4,6-diene-3,20-dione;
17α-acetoxy-19-norpregna-4,6-diene-3,20-dione;
16α-methyl-17α-acetoxypregna-4,6-diene-3,20-dione;
16α-methyl-17α-acetoxy-19-norpregna-4,6-diene-3,20-dione;
6-chloro-16α-methylpregna-4,6-diene-3,20-dione;
6-chloro-16α-methyl-19-norpregna-4,6-diene-3,20-dione;
6-chloro-17α-acetoxypregna-4,6-diene-3,20-dione;
6-chloro-16α-methyl-17α-acetoxypregna-4,6-diene-3,20-dione;
17α-hydroxypregna-4,6-diene-3,20-dione; and
6-chloro-16α-methyl-17α-acetoxy-19-norpregna-4,6-diene-3,20-dione; are converted to the 6α,7α-ethylene and 6β,7β-ethylene derivatives, namely 6β-chloro-6α,7α-ethylenepregn-4-ene-3,20-dione, and the
  6α-chloro-6β,7β-isomer;
6β-chloro-6α,7α-ethylene-19-norpregn-4-ene-3,20-
  dione, and the 6α-chloro-6β,7β-isomer;
6β-fluoro-6α,7α-ethylene-16α-methylpregn-4-ene-
  3,20-dione, and the 6α-fluoro-6β,7β-isomer;
6α,7α-ethylene-6β,16α-dimethyl-19-norpregn-4-ene-
  3,20-dione, and the 6α-methyl-6β,7β-isomer;
6α,7α-ethylene-19-norpregn-4-ene-3,20 - dione, and the
  6β,7β-isomer;
6α7α-ethylene-17α-hydroxy-19-norpregn-4-ene-3,20-
  dione, and the 6β,7β-isomer;
6α,7α-ethylene-16α-methylpregn-4-ene-3,20-dione, and the
  6β,7β-isomer;
6α,7α-ethylene-16α-methyl-19-norpregn-4-ene-3,20-
  dione, and the 6β,7β-isomer;
6α,7α-ethylene-17α-acetoxypregn-4-ene-3,20-dione, and
  the 6β,7β-isomer;
6α7α-ethylene-17α-acetoxy-19-norpregn-4-ene-3,20-
  dione, and the 6β,7β-isomer;
6α,7α-ethylene-16α-methyl-17α-acetoxypregn-4-ene-
  3,20-dione, and the 6β,7β-isomer;
6α,7α-ethylene-16α-methyl-17α-acetoxy-19-norpregn-
  4-ene-3,20-dione, and the 6β,7β-isomer;
6β-chloro-6α,7α-ethylene-17α-acetoxypregn-4-ene-3,20-
  dione, and the 6α-chloro-6β,7β-isomer;
6β-chloro-6α,7α-ethylene-16α-methyl-19-norpregn-4-
  ene-3,20-dione, and the 6α-chloro-6β,7β-isomer;
6β-chloro-6α,7α-ethylene-17α-acetoxypregn-4-ene-3,20-
  dione, and the 6α-chloro-6β,7β-isomer;
6β-chloro-6α,7α-ethylene-16α-methyl-17α-acetoxy-
  pregn-4-ene-3,20-dione, and the 6α-chloro-
  6β,7β-isomer;
6α,7α-ethylene-17α-hyroxypregn-4-ene-3,20-dione, and
  the 6β,7β-isomer; and
6β-chloro-6α,7α-ethylene-16α-methyl-17α-acetoxy-19-
  norpregn-4-ene-3,20-dione, and the 6α-chloro-
  6β,7β-isomer, respectively.

EXAMPLE 2

Utilizing the procedure of Example 1 with the exception of substituting the following olefins, namely tetrafluoroethylene, 1,2-difluoroethylene, butene-2, 2,3 - difluorobutene-2, and 1,2-dichloro-1,2-difluoroethylene in place of ethylene, the starting materials 6-dehydroprogesterone and then 6-dehydro-19-norprogesterone are converted to the following final products, namely 6α,7α-tetrafluoroethylenepregn-4-ene-3,20-dione, and the
  6β,7β-isomer;
6α,7α-(1',2'-difluoro)ethylenepregn-4-ene-3,20-dione,
  and the 6β,7β-isomer;
6α,7α-(1',2'-dimethyl)ethylenepregn-4-ene-3,20-dione,
  and the 6β,7β-isomer;
6α,7α-(1',2'-difluoro-1',2'-dimethyl)ethylenepregn-4-
  ene-3,20-dione, and the 6β,7β-isomer;
6α,7α-(1',2'-dichloro-1',2'-difluoro)ethylenepregn-4-
  ene-3,20-dione, and the 6β,7β-isomer;
6α,7α-tetrafluoroethylene-19-norpregn-4-ene-3,20-dione,
  and the 6β,7β-isomer;
6α,7α-(1',2'-difluoro)ethylene-19-norpregn-4-ene-3,20-
  dione, and the 6β,7β-isomer;
6α,7α-(1',2'-dimethyl)ethylene-19-norpregn-4-ene-3,20-
  dione, and the 6β,7β-isomer;
6α,7α-(1',2'-difluoro-1',2'-dimethyl)ethylene-19-
  norpregn-4-ene-3,20-dione, and the 6β,7β-
  isomer; and
6α,7α-(1',2'-dichloro-1',2'-difluoro)ethylene-19-
  norpregn-4-ene-3,20-dione, and the
  6β,7β-isomer.

EXAMPLE 3

A mixture of 2.0 g. of 17α,21-dihydroxypregna-4,6-dien-3,20-dione in 140 ml. of benzene in a Pyrex container is irradiated at room temperature for a period of several hours while bubbling ethylene through the solution. At the end of the reaction time, which is followed by the U.V. spectra, the reaction mixture is evaporated in vacuo to dryness to furnish a residue containing a 4α,5α-ethylene adduct, a 4β,5β-ethylene adduct, a 4β,5α-ethylene adduct, a 6α,7α-ethylene adduct and a 6β,7β-ethylene adduct. The residue is separated by chromatography on silica eluting with ethyl acetate:benzene to yield 6α,7α - ethylene-17α,21-dihydroxypregn-4-en-3,20-dione, and 6β,7β-ethylene - 17α,21 - dihydroxypregn-4-en-3,20-dione, each of which is recrystallized from methanol:methylene chloride.

A mixture of 1.34 g. of 6α,7α-ethylene-17α,21-dihydroxypregn-4-ene-3,20-dione, 0.38 ml. of methanesulfonyl chloride and 10 ml. of pyridine is allowed to stand at room temperature for 16 hours and is then poured into ice water. The mixture is extracted several times with methylene chloride. The combined methylene chloride extracts are washed with 2 N hydrochloric acid, aqueous potassium bicarbonate solution, and saturated aqueous sodium chloride solution, dried over magnesium sulfate and evaporated to dryness. This resulting residue and 3.6 g. of sodium iodide is added to 150 ml. of acetone, and boiled for 40 minutes. The mixture is then evaporated to dryness under reduced pressure leaving a residue which is then extracted several times with methylene chloride. The combined extracts are washed with saturated aqueous sodium chloride solution, dried over magnesium sulfate and evaporated to dryness. A suspension of the thus-obtained residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 6α,7α-ethylene-17α-hydroxypregn-4-ene-3,20-dione which can be further purified through recrystallization from acetone:hexane.

By repeating the latter steps of the above procedure, with 6β,7β - ethylene-17α,21-dihydroxypregn-4-en-3,20-dione, there is obtained the corresponding 6β,7β-ethylene-17α-hydroxypregn-4-ene-3,20-dione.

Utilizing the above procedure and 17α,21-dihydroxy-19-norpregna-4,6-diene-3,20-dione as the starting material, there is obtained the corresponding 19-nor compound, namely 6α,7α-ethylene-17α-hydroxy - 19 - norpregn-4-ene-3,20-
  dione; and
6β,7β-ethylene-17α-hydroxy - 19 - norpregn-4-ene-3,20-
  dione, respectively.

In a similar fashion, tetrafluoroethylene is treated separately with each starting material of this example to afford the 6α,7α- and 6β,7β-tetrafluoroethylene-17α-hydroxypregn-4-ene-3,20-diones, and the 6α,7α- and 6β,7β-tetrafluoroethylene-17α-hydroxy-19-norpregn - 4 - ene-3, 20-diones.

EXAMPLE 4

A mixture of 1 g. of 6α,7α-ethylene-17α-hydroxypregn-4-ene-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted several times with methylene chloride, and the combined methylene chloride extracts are dried and evaporated to dryness to yield 6α,7α-ethylene-17α-acetoxypregn-4-ene-3,20-dione which is recrystallized from acetone:ether.

By repeating the above procedure with 6β,7β-ethylene-17α-hydroxypregn-4-ene-3,20-dione, there is obtained the corresponding 6β,7β - ethylene-17α-acetoxypregn-4-ene-3, 20-dione.

Utilizing the above procedure, other novel 17α-hydroxy compounds described herein, e.g. see Example 3, are converted to their corresponding 17α-acetoxy derivatives, among which are the following:

6α,7α-tetrafluoroethylene - 17α - acetoxypregn-4-ene-3,20-dione;

6α,7α-ethylene-17α-acetoxy - 19 - norpregn-4-ene-3,20-dione; and

6α,7α-tetrafluoroethylene - 17α - acetoxy-19-norpregn-4-ene-3,20-dione.

By repeating the above procedure with the 6β,7β-isomers of the above starting materials, there are obtained the corresponding 6β,7β-final products.

Utilizing the same procedure, but substituting caproic anhydride and then enanthic anhydride for acetic anhydride, there are obtained the corresponding 17α-caproates and 17α-enanthates.

EXAMPLE 5

A solution of 200 mg. of 6α,7α-ethylenepregn-4-ene-3,20-dione in 32 ml. of anhydrous isopropanol and 25 mg. of sodium borohydride is stirred at room temperature for 15 hours. One-hundred ml. of water is added and the resulting suspension extracted several times with ether. The ether extracts are combined, dried over sodium sulfate and evaporated to dryness under reduced pressure to yield 3β-hydroxy-6α,7α-ethylenepregn-4-en-20-one which can be further purified by recrystallization from ether.

Two milliliters of dihydropyran are added to a solution of 1 g. of 3β-hydroxy-6α,7α-ethylenepregn-4-en-20-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-(tetrahydropyran-2'-yloxy)-6α,7α-ethylenepregn-4-en-20-one which is recrystallized from pentane.

By repeating the above procedure with the 6β,7β-isomer of the above starting material, there is obtained the corresponding 3β-(tetrahydropyran-2'-yloxy)-6β,7β-ethylenepregn-4-en-20-one.

Utilizing the same procedure, the following starting materials, namely

6α,7α-tetrafluoroethylenepregn-4-ene-3,20-dione;
6α,7α-ethylene-17α-acetoxypregn-4-ene-3,20-dione;
6α,7α-tetrafluoroethylene-17α-acetoxypregn-4-ene-3,20-dione;
6α,7α-ethylene-6β-methyl-17α-acetoxypregn-4-ene-3,20-dione; and
6α,7α-(1',2'-dimethyl)ethylene-19-norpregn-4-ene-3,20-dione, are converted to the corresponding 3β-tetrahydropyran-2'-yloxy derivatives, namely 3β-(tetrahydropyran-2'-yloxy)-6α,7α-tetrafluoroethylenepregn-4-en-20-one;
3β-(tetrahydropyran-2'-yloxy)-6α, 7α-ethylene-17α-acetoxy-pregn-4-en-20-one;
3β-(tetrahydropyran-2'-yloxy)-6α,7α-tetrafluoroethylene-17α-acetoxypregn-4-en-20-one;
3β-(tetrahydropyran-2'-yloxy)-6α,7α-ethylene-6β-methyl-17α-acetoxypregn-4-en-20-one; and
3β-(tetrahydropyran-2'-yloxy)-6α,7α-(1',2'-dimethyl)-ethylene-19-norpregn-4-en-20-one, respectively.

By repeating the above procedure with the 6β,7β-isomers of the above starting materials, there are obtained the corresponding 6β,7β-final products.

EXAMPLE 6

A solution of 200 mg. of 6α,7α-ethylenepregn-4-ene-3,20-dione in 32 ml. of anhydrous isopropanol and 50 mg. of sodium borohydride is stirred at room temperature for 15 hours. One hundred ml. of water is added and the resulting suspension extracted several times with ether. The ether extracts are combined, dried over sodium sulfate and evaporated to dryness under reduced pressure to yield 3β-hydroxy-6α,7α-ethylenepregn-4-en-20-one which can be further purified by recrystallization from ether.

A mixture of 1 g. of 3β-hydroxy-6α,7α-ethylenepregn-4-en-20-one, 4 ml. of pyridine and 2 ml. of acetic anhydride is allowed to stand at room temperature for 15 hours. The mixture is then poured into ice water, and the solid which forms is removed by filtration, washed with water and then dried to yield 3β-acetoxy-6α,7α-ethylenepregn-4-en-20-one which can be further purified by recrystallization from acetone:hexane.

Utilizing the same procedure, the following starting materials, namely

6α,7α-tetrafluoroethylenepregn-4-ene-3,20-dione;
6α,7α-ethylene-17α-acetoxypregn-4-ene-3,20-dione;
6α,7α-tetrafluoroethylene-17α-acetoxypregn-4-ene-3,20-dione; and
6α,7α-(1',2'-difluoro)ethylene-16α-methylpregn-4-ene-3,20-dione; are converted to the corresponding 3β-acetoxy derivatives, namely 3β-acetoxy-6α,7α-tetrafluoroethylenepregn-4-en-20-one;
3β,17α-diacetoxy-6α,7α-ethylenepregn-4-en-20-one;
3β,17α-diacetoxy-6α,7α-tetrafluoroethylenepregn-4-en-20-one; and
3β-acetoxy-6α,7α(1'2'-difluoro)ethylene-16α-methylpregn-4-20-one, respectively.

By repeating the above procedure with the 6β,7β-isomers of the above starting materials, there are obtained the corresponding 6β,7β-final products.

EXAMPLE 7

A mixture of 0.5 g. of 6α,7α-ethylenepregn-4-ene-3,20-dione, 10 ml. of dioxane and 0.35 g. of 2,3-dichloro-5,6-dicyano-1,4-benzoquinone is refluxed for ten hours. The reaction mixture is then cooled, filtered and the organic filtrate is evaporated to dryness. The resulting residue is dissolved in acetone and this solution is then filtered through 10 g. of alumina. The acetone is removed by evaporation to yield 6α,7α-ethylenepregna-1,4-diene-3,20-dione which is further purified by recrystallization from acetone:hexane.

By repeating the above procedure with the 6β,7β-isomer of the above starting material, there is obtained the corresponding 6β,7β-isomer.

EXAMPLE 8

A mixture of 2 g. of 6-chloro-17α-acetoxypregna-4,6-diene-3,20-dione and 2 g. of stilbene in 140 ml. of benzene in a Pyrex container is irradiated with a 200 watt high pressure mercury vapor lamp at room temperature for a period of three hours. After the end of the reaction time, the mixture is evaporated to dryness to furnish a residue containing a 4α,5α-(1',2'-diphenyl)-ethylene adduct, a 4β,5α-(1',2-diphenyl)ethylene adduct, a 6α,7α-(1',2'-diphenyl)ethylene adduct, and a 6β,7β-(1',2'-diphenyl) ethylene adduct. This residue is separated by chromatography on silica eluting with ethyl acetate:benzene to yield 6β - chloro - 6α,7α - (1',2' - diphenyl)ethylene-17α-acetoxypregn-4-ene-3,20-dione and the 6α-chloro-6β,7β- isomer, each of which is recrystallized from methanol:methylene chloride.

Utilizing the above procedure with the exception of substituting 1',2'-dichloroethylene and then α,α'-difluorostilbene for stilbene, there are obtained the corresponding final products, namely 6β-chloro-6α,7α-(1',2'-dichloro)ethylene-17α-acetoxypregn-4-ene-3,20-dione, and the 6α-chloro-6β,7β-isomer; and
6β-chloro-6α,7α-(1',2'-difluoro-1',2'-diphenyl)ethylene-17α-acetoxypregn-4-ene-3,20-dione, and the 6α-chloro-6β,7β-isomer, respectively.

EXAMPLE 9

A solution of 1 g. of sodium borohydride in 3 ml. of water is added to an ice-cooled solution of 1 g. of 6-dehydroprogesterone in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β,20-dihydroxypregna-4,6-diene which may be further purified by recrystallization from acetone:hexane.

One gram of 3β,20-dihydroxypregna-4,6-diene in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 20-hydroxypregna-4,6-dien-3-one which may be further purified through recrystallization from acetone:hexane.

A mixture of 2.0 g. of 20-hydroxypregna-4,6-dien-3-one in 140 ml. of benzene is irradiated with a 70 watt Hanau high pressure mercury vapor lamp with a Pyrex filter at room temperature for a period of several hours while bubbling ethylene through the solution. At the end of the reaction time, which may be followed by the U.V. spectra, the mixture of reaction products is evaporated in vacuo to dryness, chromatographed on silica eluting with ethylacetate:benzene to yield 6α,7α-ethylene-20-hydroxypregn-4-en-3-one which is recrystallized for methanol:methylene chloride.

To a stirred solution of 1 g. of 6α,7α-ethylene-20-hydroxypregn-4-en-3-one in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for five minutes at 0–5° C. and diluted with water. The solid which forms is collected by filtration, washed with water and dried under vacuum to yield 6α,7α-ethylenepregn-4-ene-3,20-dione which may be further purified by recrystallization from acetone:hexane.

EXAMPLE 10

To a solution of 5 g. of 17α,21-dihydroxypregna-4,6-diene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17,20:20,21-bismethylenedioxypregna-4,6-dien-3-one which is recrystallized from methanol:ether.

A mixture of 2.0 g. of 17,20:20,21-bismethylenedioxypregna-4,6-dien-3-one in 140 ml. of benzene is irradiated at room temperature for a period of several hours while bubbling ethylene through the solution. At the end of the reaction time, which can be followed by the U.V. spectra, the mixture of reaction products is evaporated in vacuo to dryness, chromatographed on silica eluting with ethylacetate:benzene to yield 6α,7α-ethylene-17,20:20,21-bismethylenedioxypregn-4-en-3-one which is recrystallized from methanol:methylene chloride.

One gram of 6α,7α-ethylene-17,20:20,21-bismethylenedioxypregn-4-en-3-one in 100 ml. of 80% acetic acid under nitrogen for seven hours. The mixture is then concentrated under vacuum to a small volume and poured into water. The solid which forms is collected by filtration, washed well with water, dried and recrystallized from acetone:hexane to yield 6α,7α-ethylene-17α,21-dihydroxypregn-4-ene-3,20-dione.

A mixture of 1.34 g. of 6α,7α-ethylene-17α,21-dihydroxypregn-4-ene-3,20-dione, 0.38 ml. of methanesulfonyl chloride and 10 ml. of pyridine is allowed to stand at room temperature for 16 hours and is then poured into ice water and extracted with methylene chloride. The extracts are washed wth 2 N hydrochloric acid, aqueous potassium bicarbonate solution, and saturated aqueous sodium chloride solution, dried over magnesium sulfate and evaporated to dryness. This residue and 3.6 g. of sodium iodide is added to 150 ml. of acetone, boiled for 40 minutes and evaporated to dryness under reduced pressure. The residue is extracted with methylene chloride. These extracts are washed with saturated aqueous sodium chloride solution, dried over magnesium sulfate and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried, and evaporated to dryness to yield 6α,7α-ethylene-17α-hydroxypregn-4-ene-3,20-dione which may be further purified through recrystallization from acetone:hexane.

Utilizing the above procedure and 17α,21-dihydroxy-19-norpregna-4,6-diene-3,20-dione as the starting material, there is obtained the corresponding 19-nor compound, namely 6α,7α - ethylene-17α-hydroxy-19-norpregn-4-ene-3,20-dione.

In a similar fashion, tetrafluoroethylene is allowed to react with each starting material separately to afford 6α,7α-tetrafluoroethylene - 17α - hydroxypregn-4-ene-3,20-dione and 6α,7α-tetrafluoroethylene-17α-hydroxy-19-norpregn-4-ene-3,20-dione.

What is claimed is:

1. A compound of the formula:

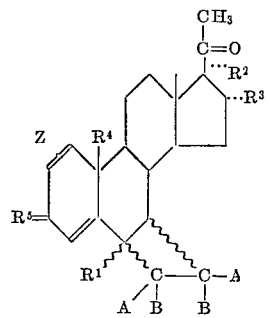

wherein Z is a carbon-carbon single bond or a carbon-carbon double bond;

$R^1$ is hydrogen, chloro, fluoro or methyl;

$R^2$ is hydrogen, hydroxy or a hydrocarbon carboxylic acryloxy group of less than 12 carbon atoms;

$R^3$ is hydrogen or methyl;

$R^4$ is hydrogen or methyl; $R^4$ being methyl when Z is a carbon-carbon double bond;

$R^5$ is keto or the group

in which $R^6$ is hydrogen, tetrahydropyran-2'-yl or a hydrocarbon carboxylic acyl group of less than 12 carbon atoms; $R^5$ being keto when Z is a carbon-carbon double bond;

A is hydrogen or fluoro; and

B is hydrogen, fluoro, chloro, methyl or phenyl.

2. A compound according to claim 1 wherein $R^1$ is hydrogen or chloro; $R^2$ is hydrogen or acetoxy; each of A and B is hydrogen or fluoro; and $R^5$ is keto.

3. A compound according to claim 2 wherein Z is a carbon-carbon single bond; each of $R^1$, $R^2$, $R^3$ and $R^4$ is hydrogen; and each of A and B is hydrogen.

4. A compound according to claim 2 wherein Z is a carbon-carbon single bond; each of $R^1$, $R^2$ and $R^3$ is hydrogen; $R^4$ is methyl; and each of A and B is hydrogen.

5. A compound according to claim 2 wherein Z is a carbon-carbon single bond; each of $R^1$ and $R^2$ is hydrogen; each of $R^3$ and $R^4$ is methyl; and each of A and B is hydrogen.

6. A compound according to claim 2 wherein Z is a carbon-carbon single bond; each of $R^1$, $R^2$ and $R^4$ is hydrogen; $R^3$ is methyl; and each of A and B is hydrogen.

7. A compound according to claim 2 wherein Z is a carbon-carbon single bond; each of $R^1$, $R^3$ and $R^4$ is hydrogen; $R^2$ is acetoxy; and each of A and B is hydrogen.

8. A compound according to claim 2 wherein Z is a carbon-carbon single bond; each of $R^1$ and $R^3$ is hydrogen; $R^2$ is acetoxy; $R^4$ is methyl; and each of A and B is hydrogen.

9. A compound according to claim 2 wherein Z is a carbon-carbon single bond; each of $R^1$ and $R^4$ is hydrogen; $R^2$ is acetoxy; $R^3$ is methyl; and each of A and B is hydrogen.

10. A compound according to claim 2 wherein Z is a carbon-carbon single bond; $R^1$ is hydrogen; $R^2$ is acetoxy; each of $R^3$ and $R^4$ is methyl; and each of A and B is hydrogen.

11. A compound according to claim 2 wherein Z is a carbon-carbon single bond; $R^1$ is chloro; each of $R^2$, $R^3$ and $R^4$ is hydrogen; and each of A and B is hydrogen.

12. A compound according to claim 2 wherein Z is a carbon-carbon single bond; $R^1$ is chloro; each of $R^2$ and $R^3$ is hydrogen; $R^4$ is methyl; and each of A and B is hydrogen.

13. A compound according to claim 2 wherein Z is a carbon-carbon single bond; $R^1$ is chloro; $R^2$ is hydrogen; each of $R^3$ and $R^4$ is methyl; and each of A and B is hydrogen.

14. A compound according to claim 2 wherein Z is a carbon-carbon single bond; $R^1$ is chloro; each of $R^2$ and $R^4$ is hydrogen; $R^3$ is methyl; and each of A and B is hydrogen.

15. A compound according to claim 2 wherein Z is a carbon-carbon single bond; $R^1$ is chloro; $R^2$ is acetoxy; each of $R^3$ and $R^4$ is hydrogen; and each of A and B is hydrogen.

16. A compound according to claim 2 wherein Z is a carbon-carbon single bond; $R^1$ is chloro; $R^2$ is acetoxy; $R^3$ is hydrogen; $R^4$ is methyl; and each of A and B is hydrogen.

17. A compound according to claim 2 wherein Z is a carbon-carbon single bond; $R^1$ is chloro; $R^2$ is acetoxy; $R^3$ is methyl; $R^4$ is hydrogen; and each of A and B is hydrogen.

18. A compound according to claim 2 wherein Z is a carbon-carbon single bond; $R^1$ is chloro; $R^2$ is acetoxy; each of $R^3$ and $R^4$ is methyl; and each of A and B is hydrogen.

19. A compound according to claim 1 wherein Z is a carbon-carbon single bond; $R^1$ is hydrogen or chloro; $R^2$ is hydrogen or acetoxy; $R^3$ is hydrogen or methyl; $R^4$ is methyl; $R^5$ is the group

in which $R^6$ is tetrahydropyran-2'-yl; and each of A and B is hydrogen or fluoro.

20. A compound according to claim 1 wherein Z is a carbon-carbon single bond; $R^1$ is hydrogen or chloro; $R^2$ is hydrogen or acetoxy; $R^3$ is hydrogen or methyl; $R^4$ is methyl; $R^5$ is the group

in which $R^6$ is acetyl; and each of A and B is hydrogen or fluoro.

No references cited.

HENRY A. FRENCH, Primary Examiner

U.S. Cl. X.R.

204—158; 260—397.3, 397.4, 999

UNITED STATES PATENT OFFICE
CERTIFICATE OF CORRECTION

Patent No. 3,485,828        Dated December 23, 1969

Inventor(s) John A. Zderic

It is certified that error appears in the above-identified patent and that said Letters Patent are hereby corrected as shown below:

Column 1, lines 40 to 50, the formula should appear as follows:

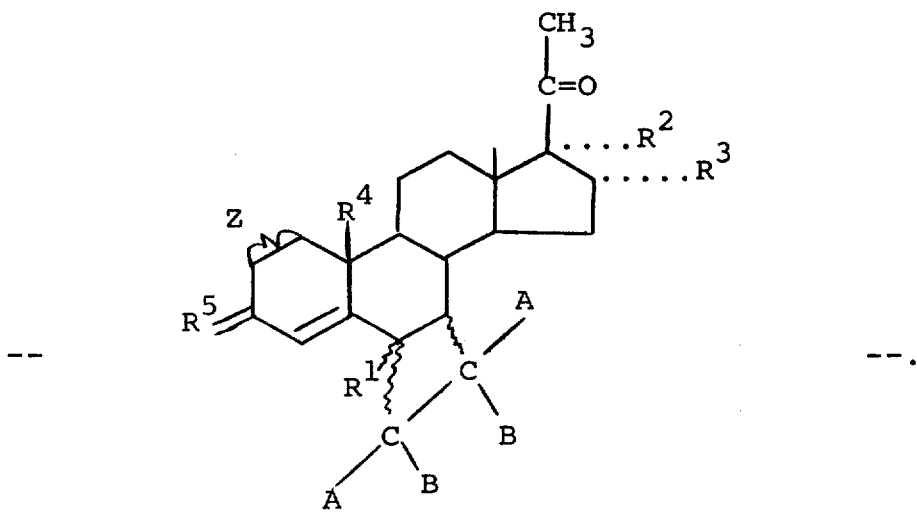

Column 1, between lines 56 and 57, insert --$R^3$ is hydrogen or methyl;--.

Column 3, line 7, "wherin" should read --wherein--.

Column 3, line 26, "ethyelne" should read --ethylene--.

Con't

UNITED STATES PATENT OFFICE
CERTIFICATE OF CORRECTION

Patent No. 3,485,828      Dated December 23, 1969

Inventor(s) John A. Zderic      PAGE - 2

It is certified that error appears in the above-identified patent and that said Letters Patent are hereby corrected as shown below:

Column 3, line 54, "3β-acyloxy)" should read --3β-(acyloxy)--.

Column 5, line 19, "6α7α" should read --6α,7α--.

Column 5, line 25, "17α-acetoxypregn" should read --16α-methylpregn--.

Column 7, line 58, "acetoxy-pregn" should read --acetoxypregn--.

Column 8, line 57, "4β,5α" should read --4β,5β--.

Column 8, line 57, "(1',2-diphenyl)" should read --(1',2'-diphenyl)--.

Column 8, line 57, after "adduct," insert --a 4β,5α-(1',2'-diphenyl)ethylene adduct,--.

Column 9, line 31 "for" should read --from--.

Column 10, line 56, in Claim 1, "acryloxy" should read --acyloxy--.

SIGNED AND SEALED

JUN 3 0 1970

(SEAL)
Attest:

Edward M. Fletcher, Jr.
Attesting Officer

WILLIAM E. SCHUYLER, JR.
Commissioner of Patents